United States Patent

Hamamura et al.

[11] Patent Number: 5,920,169
[45] Date of Patent: Jul. 6, 1999

[54] SERVOMOTOR CONTROL METHOD

[75] Inventors: Minoru Hamamura, Numazu; Sadaji Hayama; Jun Fujita, both of Mishima, all of Japan

[73] Assignee: Toshiba Kikai Kabushiki Kaisha, Tokyo-to, Japan

[21] Appl. No.: 08/914,881

[22] Filed: Aug. 20, 1997

[30] Foreign Application Priority Data

Aug. 21, 1996 [JP] Japan .................................. 8-220038

[51] Int. Cl.⁶ .................................................. G05B 13/00
[52] U.S. Cl. ............... 318/561; 318/568.18; 318/568.22; 318/609; 364/474.29
[58] Field of Search .............................. 318/561, 568.18, 318/568.22, 615–617, 609; 364/474.15, 474.28, 474.29, 474.31

[56] References Cited

U.S. PATENT DOCUMENTS

| 4,743,822 | 5/1988 | Futami et al. ........................... 318/610 |
| 4,916,375 | 4/1990 | Kurakake et al. ....................... 318/630 |
| 4,961,034 | 10/1990 | Kakino et al. .......................... 318/600 |
| 5,204,602 | 4/1993 | Iwashita .................................. 318/630 |
| 5,598,077 | 1/1997 | Matsubara et al. ................. 318/568.22 |

*Primary Examiner*—Brian Sircus
*Attorney, Agent, or Firm*—Fish & Richardson P.C.

[57] ABSTRACT

The position of a movable body driven for circular interpolation movement by servomotors is measured directly or indirectly, and the servomotors are controlled in a feedback control mode to drive the movable body for movement according to a position command signal. A torque signal at quadrant change in which the direction of movement of the movable body changes, and a maximum or minimum torque signal at a moment immediately after the reversion of the servomotor are detected, a reference torque for correction is determined on the basis of the difference between the torque signal value at quadrant change and the maximum or minimum torque command value, and the torque signal at quadrant change is corrected with reference to the reference torque.

6 Claims, 6 Drawing Sheets

SERVOMOTOR CONTROL METHOD

BACKGROUND OF THE INVENTION

1. Field of the Invention

The present invention relates to a method of controlling a servomotor for driving a feed drive mechanism included in a machine tool or a robot arm of an industrial robot. More specifically, the present invention relates to techniques for improving a delay in a response to a command signal for reversion of the servomotor.

2. Description of the Related Art

A control system for a servomotor included in a machine tool provides with a position control loop which makes the deviation of a position feedback signal provided by a position transducer from an reference position reduced to zero. A velocity control loop provided a velocity feedback signal produced by differentiating the position feedback signal sends an output signal of a velocity loop gain as a torque signal to the servomotor.

Figure 7:
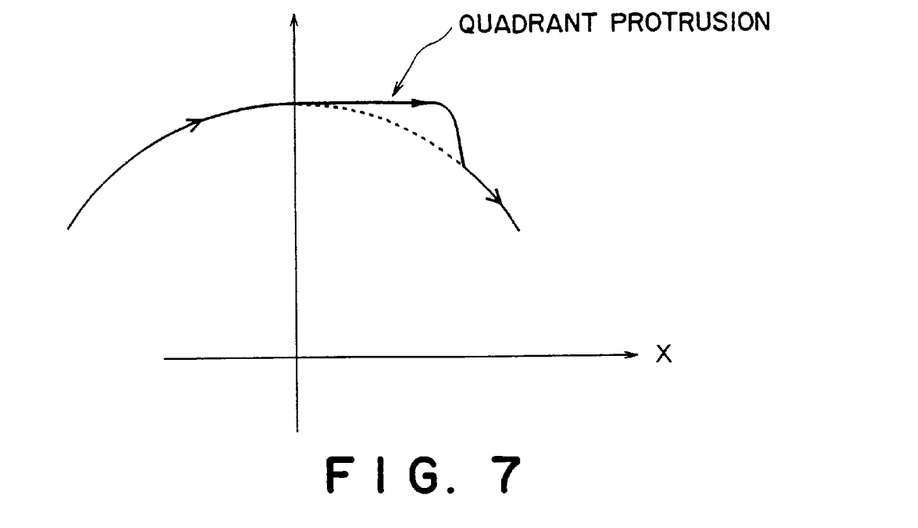
FIG. 7 is a graph of assistance in explaining the deviation of a path of a movable body from a desired path when the movable body moves for quadrant change.

It is unable to reverse a moving direction of a movable body which driven by a servomotor for a circular interpolation feed motion, when the rotating direction of the servomotor is changed. The delay is due to lost motions and friction in the feed drive mechanism. When the movable body moves along a circular path from one quadrant to an adjacent quadrant (such movement of the movable body will be referred to as movement for quadrant change) during machining, an actual path of the movable body deviates and bulges out from a desired path specified by a path command as shown in FIG. 7. This phenomenon is called a stick motion or a quadrant protrusion and is one of factors of the deterioration of accuracy in contour machining. Such a phenomenon is presumed to be attributable to the temporary stoppage of the feed drive mechanism due to delay caused by the response characteristic of the velocity loop.

Figure 8:
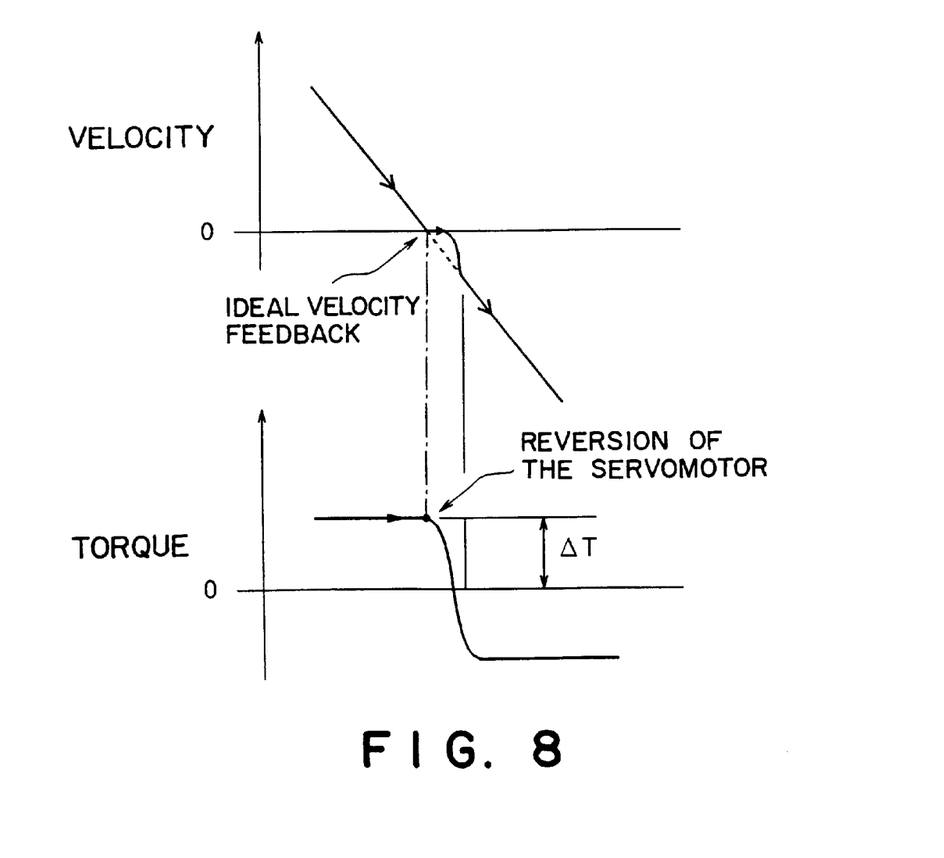
FIG. 8 is a graph showing a detected torque signal detected by a conventional servomotor control method during the movement of a movable body for quadrant change.

As shown in FIG. 8, a conventional correction method, which has been employed in reducing the quadrant protrusion, detects a torque signal AT at the moment when the servomotor is reversed as an inversion torque signal. The reference torque for correction is obtained by multiplying the torque signal AT by a predetermined correction coefficient.

However, the inversion torque signal at the moment of the reversion cannot be accurately detected when the servomotor is operated for a rapid feed operation, which is affected greatly by inertial force, or when the machine tool has a vertical axis on which exerts the effect of gravity. Especially, the inversion torque signal at the moment of reversion cannot be detected and correction cannot be achieved if the torque signal has a negative value due to the influence of the inertial force.

It was found through experiments on a torque correction at the reversion of the servomotor under conditions of different feed rates and circular arcs of different radii that an inward protrusion occurs before the quadrant protrusion under some feed rate and a circular arc of some radius.

SUMMARY OF THE INVENTION

Accordingly, it is an object of the present invention to provide a servomotor control method, capable of accurately determining a reference torque when the servomotor is reversed without being affected by inertial forces, gravity, feed rate and the radius of a circular arc corresponding to the path of a movable body, and is capable of accurately reducing a quadrant protrusion on the basis of the determined reference torque.

According to one aspect of the present invention, a method for controlling a servomotor to drive a movable body for a circular interpolation feed motion, while measuring a position of the movable body directly or indirectly to provide a feedback signal, said method comprising steps of detecting a torque signal sent to the servomotor at quadrant change in which the moving direction of the movable body changes, and a maximum or minimum torque signal sent to the servomotor at a moment immediately after the reversion of the servomotor; determining a reference torque for correction on the basis of the difference between the torque signal at quadrant change and the maximum or minimum torque signal at a moment immediately after the reversion of the servomotor; and correcting the torque signal to be delivered to the servomotor at quadrant change on the basis of the reference torque.

Since the reference torque is determined on the basis of the difference between the torque signal at quadrant change and the maximum or minimum torque signal at a moment immediately after the reversion of the servomotor, the reference torque can be accurately obtained even if the value of torque signal varies due to the influence of the inertial force of the feed shaft and gravity during the travel of the movable body for quadrant change from one quadrant into an adjacent quadrant. Since the torque signal is corrected on the basis of the reference torque unaffected by the inertial force and gravity and the corrected torque signal is fed back to a control system, the quadrant protrusion can effectively reduced.

According to another aspect of the present invention, method for controlling a servomotor to drive a movable body for a circular interpolation feed motion, while measuring a position of the movable body directly or indirectly to provide a feedback signal, said method comprising steps of executing a test program which specifies a given radius of a circular path and a given feed rate and makes the movable body move for a test circular interpolation feed motion; detecting a torque signal sent to the servomotor at quadrant change in which the direction of motion of the movable body changes, and a maximum or minimum torque signal sent to the servomotor at a moment immediately after the reversion of the servomotor; determining a reference torque for correction for the radius and the feed rate on the basis of the difference between the torque signal at quadrant change and the maximum or minimum torque signal at a moment immediately after the reversion of the servomotor; producing a correction torque table tabulating reference torque for correction corresponding to sets each of the radius of a circular path and a feed rate by repeating the test program for different radii and different feed rates; and correcting the torque signal to be delivered to the servomotor at quadrant change on the basis of the reference torque read from the correction torque table during the execution of a NC program.

This servomotor control method, similarly to the foregoing servomotor control method, is capable of carrying out torque correction unaffected by an inertial force and gravity, and of achieving torque correction for a circular arc of an optional radius and an optional feed rate by using the correction torque table produced through the test operation specified by the test program.

Since the correction torque table can be updated properly by executing the test program when necessary, the accurate correction can be achieved even if the reference torque changes due to the aged deterioration in the condition of the machine tool or the change of the conditions of the machine tool, such as the change of the parameters of servomechanisms and a weight on a table included in the machine tool.

Preferably, a torque signal at a moment when a velocity feedback signal drops to zero is used as a torque signal at the moment of quadrant change to determine the quadrant change position accurately.

A torque signal detected at a moment when the derivative of a differentiated torque signal becomes zero after the change of quadrant may be used as a maximum or minimum torque signal immediately after the reversion of the servomotor instead of direct detecting a maximum or minimum torque signal immediately after the reversion of the servomotor.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Figure 1:
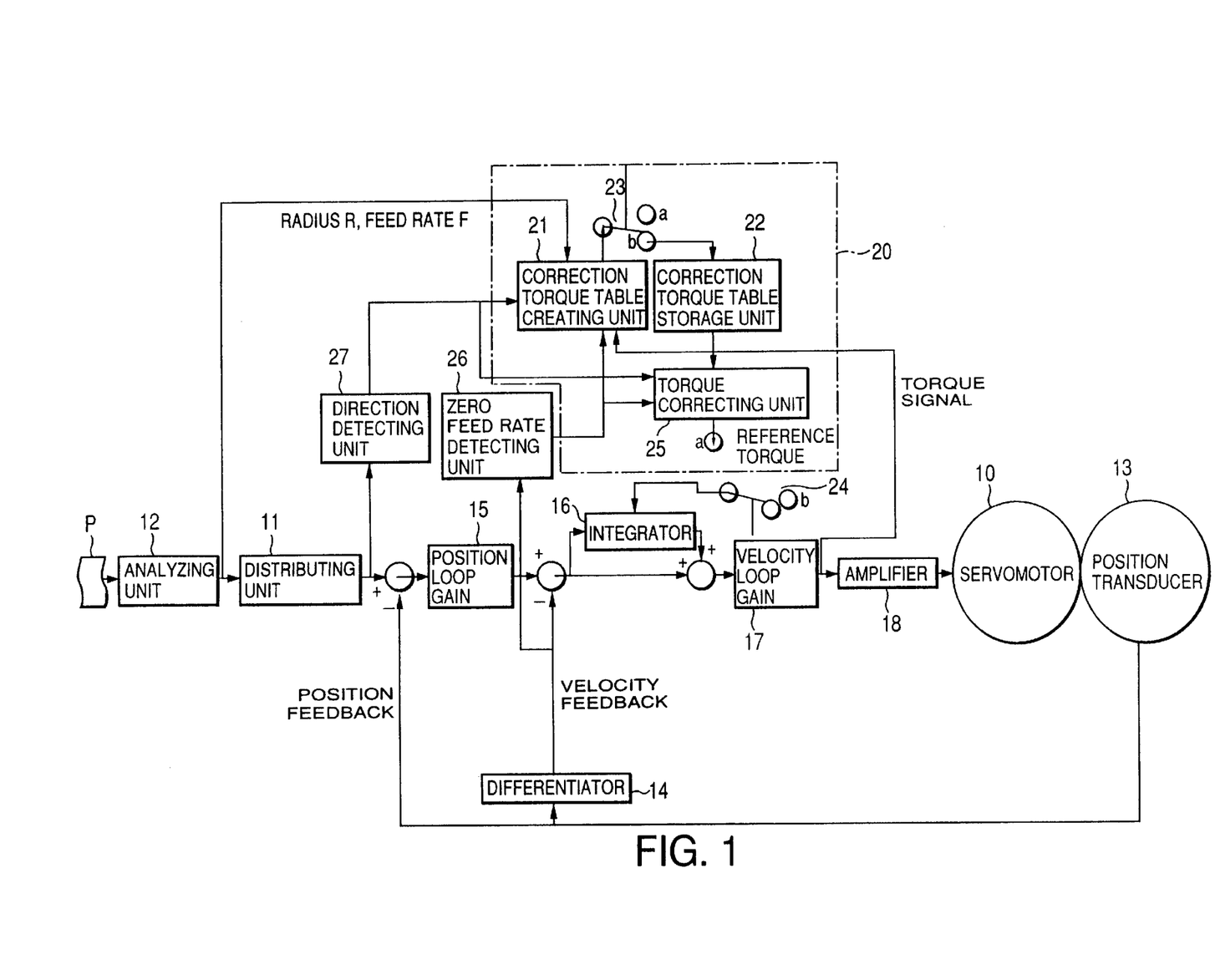
FIG. 1 is a block diagram of a servo control system for carrying out a servomotor control method in a first embodiment according to the present invention.

Shown in FIG. 1 is a servo control system with a semiclosed loop type included in a NC machine tool, for carrying out a servomotor control method in a first embodiment according to the present invention. The NC machine tool has a table loaded with a predetermined load, and the table is moved for circular interpolation feed at a predetermined feed rate along a predetermined path of a circular arc of a given radius.

Referring to FIG. 1, a servomotor 10 drives a ball screw for rotation. Two servomotors 10 respectively drive a table feed shaft and a saddle feed shaft having an axis perpendicular to that of the table feed shaft. The two axes are controlled in a two-axis control mode to drive the table for a circular interpolation feed motion.

An analyzing unit 12 converts an NC program P into command data and gives a reference position signal corresponding to a specified radius R of a circular arc and a feed rate F to a servo-mechanism through a distributing unit 11. The servomotor 10 is controlled so that the table is moved according to the position signal.

A position control system for controlling the servomotor 10 has a position control loop. A position transducer 13 is attached to the output shaft of the servomotor 10. The deviation between a position feedback signal provided by the transducer 13 and a reference position signal is reduced to zero. A velocity control loop is on the inner nest of the position control loop. A differentiator 14 differentiate the position feedback signal to provide a velocity feedback signal. The velocity feedback signal is compared with the output signal of a position loop gain 15. A current loop for controlling torque as a minor loop is on the inner nest of the velocity control loop. The output signal of a velocity loop gain 17, i.e., a torque signal, is amplified by an amplifier 18, and is given to the servomotor 10.

Figure 2:
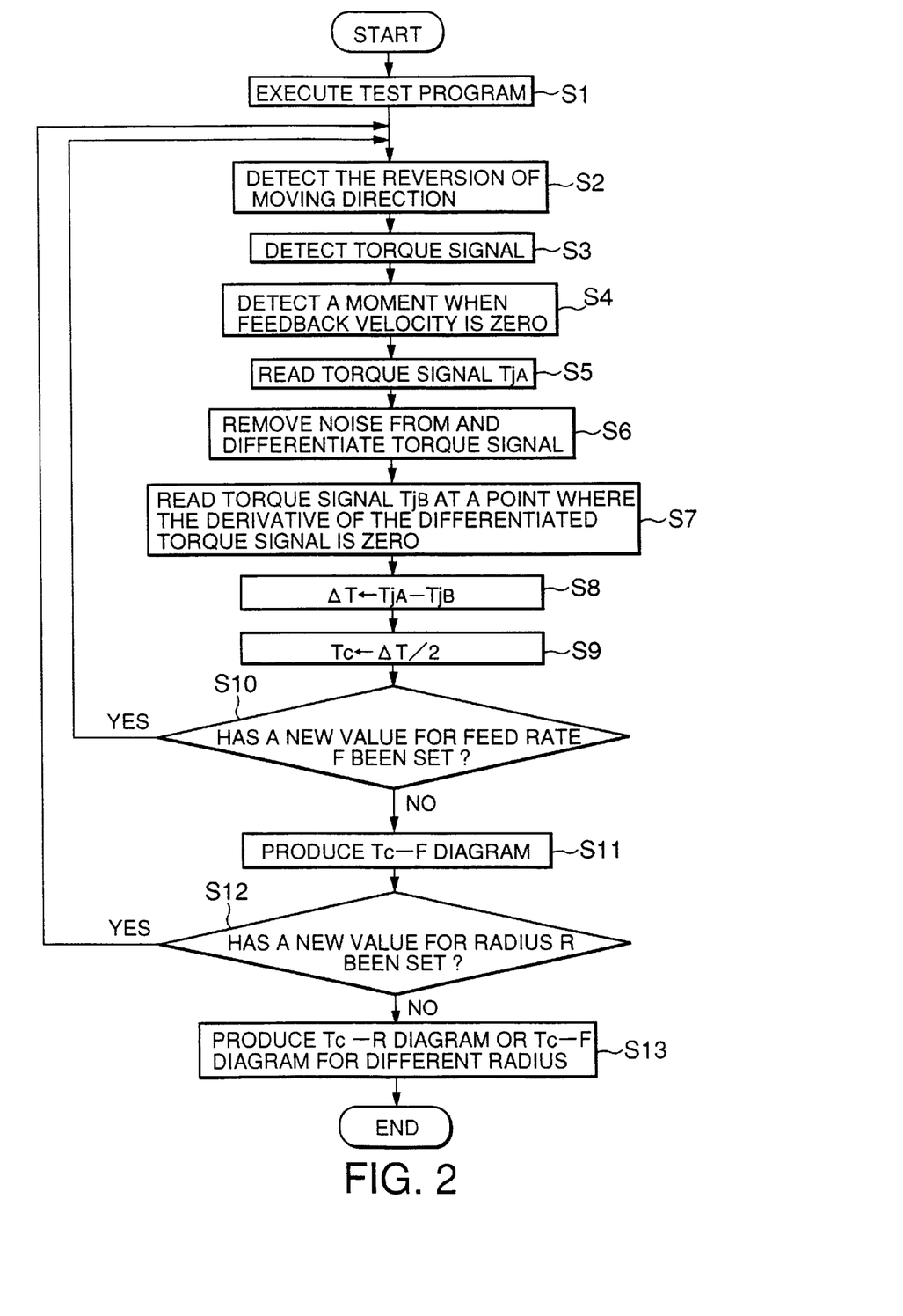
FIG. 2 is a flow chart of a control procedure to be carried out by the servo control system of FIG. 1.

The torque signal is fed back to a torque correction unit 20, and a correction torque table is produced during the execution of a test program shown in FIG. 2. When the table moves from one quadrant into an adjacent quadrant during an machining operation, a reference torque for correction produced by the torque correcting unit 20 is given to an integrator 16, and the output of the integrator 16 is fed back to the front state of the velocity loop gain 17 to correct the torque.

A servomotor control method in a first embodiment according to the present invention illustrated by a flow chart shown in FIG. 2 will be described hereinafter with reference to the block diagram of the servo control system shown in FIG. 1.

A correction torque table creating unit 21 creates a table of reference torques Tc with corresponding feed rates F, and a table of reference torques Tc with corresponding radii R of circular arcs. These tables are used as references for torque correction to be carried out in the moment of quadrant change. The tables of reference torques Tc are data which create a Tc-F diagram showing the relation between reference torques Tc and feed rates F, and a Tc-R diagram showing the relation between reference torques Tc and radii R of circular arcs, and are stored in a corrector torque table storage unit 22. A series of steps of creating the tables, the Tc-F diagram and the Tc-R diagram and storing the same data are executed in a test program. B-contacts of selector switches 23 and 24 are selected to execute the test program.

A-contacts of the selector switches 23 and 24 are selected to execute a NC machining program. A torque correcting unit 25 retrieves a reference torque corresponding to a feed rate F and a radius R specified in the NC machining program and carries out torque correction.

Figure 3:
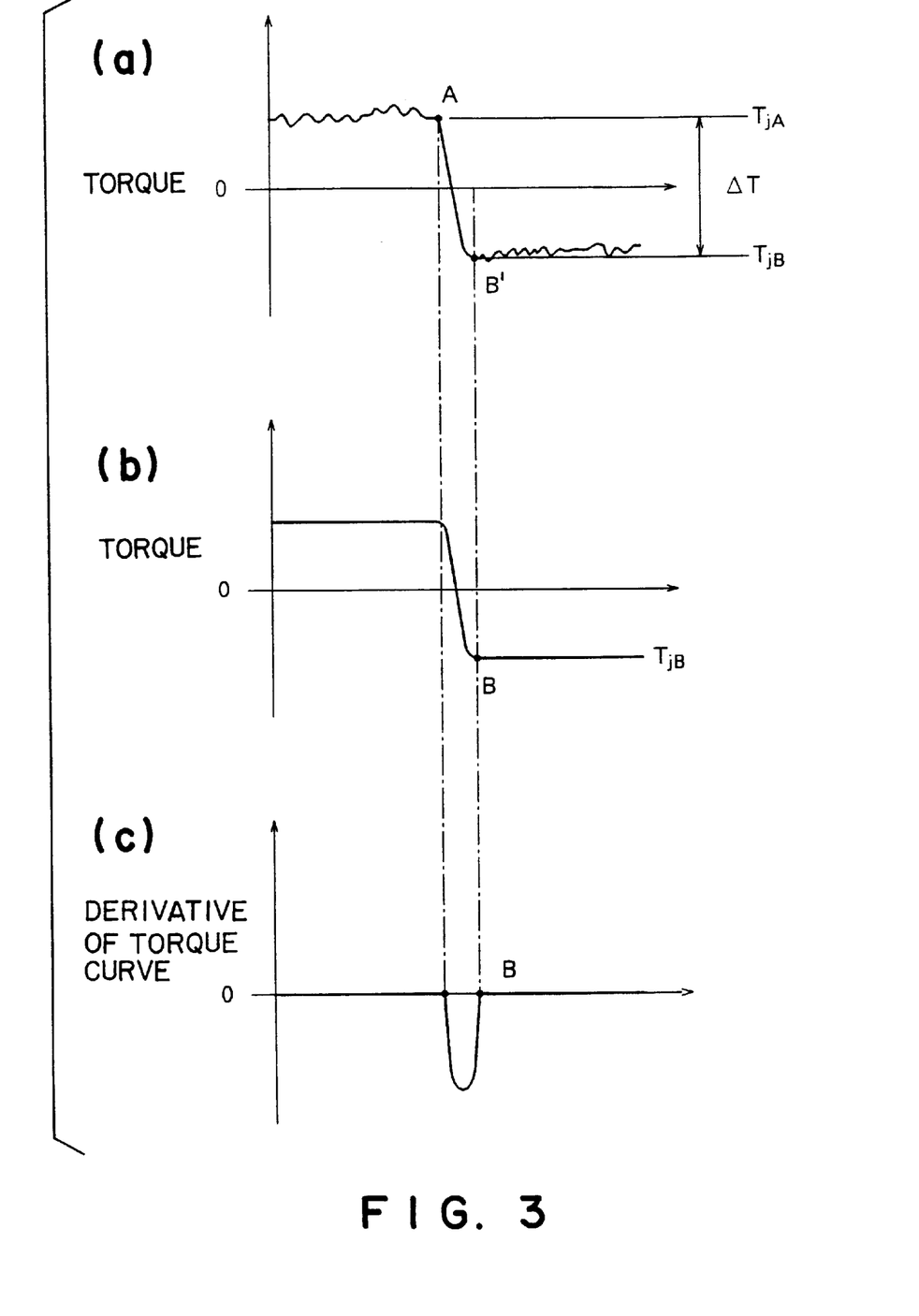
FIGS. 3(a), 3(b) and 3(c) are time charts of assistance in explaining the variation of a torque signal with time scale.

Referring to FIG. 2, the test program is started in step S1. The test program specifies a predetermined radius R and a predetermined feed rate F. When a direction detecting unit 27 which determines a moving direction from a reference position signal detects a inversion of a moving direction, i.e., quadrant change, in step S2, a torque signal is detected from the output of the velocity loop gain 17 in step S3. FIG. 3(a) shows the variation of the detected torque signal with time scale. In step S4, a zero feed rate detecting unit 26 receives a velocity feedback signal produced by differentiating a position feedback signal provided by a position transducer 13 and detects a moment when the feed rate is zero, i.e., when the velocity feed back signal goes zero.

In a state where the velocity feedback signal is zero, the ball screw is stopped temporarily. The correction torque table creating unit 21 reads a torque signal TjA at the moment when the feed rate is zero, i.e., at a point A in FIG. 3(a) in step S5.

Subsequently, the torque signal is filtered as shown in FIG. 3(b) to remove noise. The filtered signal is differentiated in step S6 to obtain a signal shown in FIG. 3(c). In step S7, as a torque signal at a moment immediately after the reversion of the servomotor 10, the correction torque table creating unit 21 reads a torque signal value TjB at a point B in FIG. 3(c) where the value of the differentiated torque signal is zero immediately after quadrant change. The torque signal TjB read by the correction torque table creating unit 21 may be a minimum torque signal immediately after the reversion of the servomotor 10, i.e., a value at a point B in FIG. 3(a) (a maximum value when the direction of the movement is reversed), instead of the value obtained by differentiating the torque signal.

Subsequently, the correction torque table creating unit 21 calculates torque signal variation ΔT by using:

$$\Delta T = TjA - TjB$$

in step S8. In steps S9, the correction torque table creating unit 21 divides the variation ΔT by two to provide a reference torque Tc. The reference torque Tc is used as a reference for torque correction at quadrant change when the radius R of the circular arc and the feed rate F are a set of given values. After the reference torque Tc has been thus determined for a set of values for radius R and feed rate F, another value is set for feed rate F (the response in step S10 is affirmative), and steps S1 to S9 of the test program are repeated to calculate a value for reference torque Tc for new conditions. In step S11, the correction torque table creating unit 21 produces a Tc-F diagram by using data obtained by executing the test program, and data representing the Tc-F diagram is stored in the correction torque table storage unit 22.

Subsequently, another value is set for radius R (the response in step S12 is affirmative), and the test program is repeated to calculate values for reference torque Tc. In step S13, the correction torque table creating unit produces a Tc-R diagram or Tc-F diagrams for different values for radius R and stores the diagrams in the correction torque table storage unit 22.

The reference torque Tc thus determined for use for torque correction at quadrant change eliminates the effect of inertial force during rapid feed and the effect of gravity which becomes effective when the feed shaft is set in a vertical axis.

Figure 4:
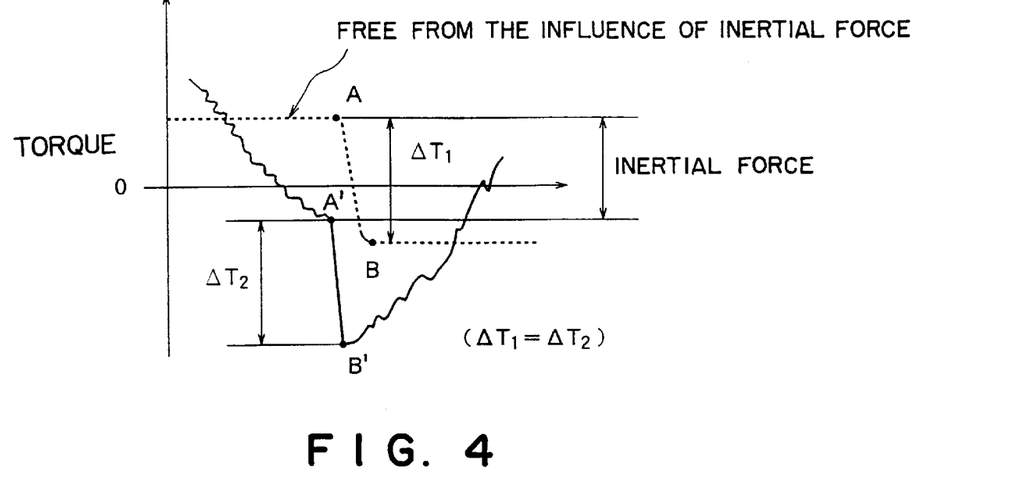
FIG. 4 is a graph showing the variation of a torque signal with time scale under the influence of an inertial force.

FIG. 4 is a diagram showing the variation of torque signal with time scale under the strong influence of inertial force, in which broken lines indicate the variation of torque signal when there is no influence of inertial force. The mode of variation of torque signal is dependent on the effect of inertial force. The differences in magnitude between torque signals at quadrant change points A and A' where velocity feedback signal is zero and those at points B and B' immediately after the reversion of the servomotor 10 where torque command signal reaches a maximum or a minimum are very large. Although the absolute value of torque signals at the points A and B where there is no influence of inertial force and the absolute value of torque signals at the points A' and B' where there is the influence of inertial force are greatly different from each other, it is known that the difference ΔT1 in the magnitude of torque signal between the points A and B and the difference ΔT2 between the points A' and B' are substantially equal to each other.

Since the difference between a torque signal at quadrant change and a maximum or minimum torque signal immediately after the reversion of the servomotor is not dependent on the influence of inertial force, the reference torque Tc obtained by dividing the torque signal variation ΔT by two is an accurate reference torque free from the influence of inertial force.

Figure 5:
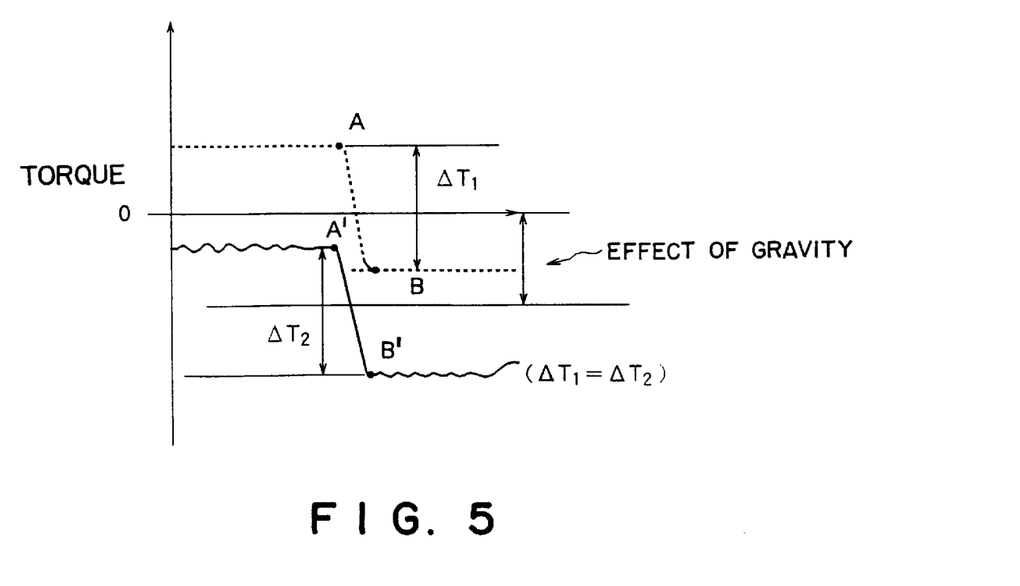
FIG. 5 is a graph showing the variation of a torque signal with time under the influence of gravity.

FIG. 5 is a diagram showing the variation of torque signal with time scale under the influence of gravity, in which broken lines indicate the variation of torque signal when there is no influence of gravity. Generally, a torque signal variation curve shifts downward when the influence of gravity is great. The magnitude of torque signals at quadrant change (points A and A') and at the reversion of the servomotor 10 (points B and B') under a condition where the influence of gravity is effective is different from that of torque signals under a condition where the influence of gravity is ineffective. But the difference ΔT1 between torque signals at points A and B, the difference ΔT2 between torque signals at points A' and B' are equal to each other. Therefore, an accurate reference torque Tc free from the influence of gravity can be obtained by determining the difference between a torque signal at quadrant change and a torque signal at the reversion of the servomotor 10.

Thus, the reference torque Tc for correction is determined by executing the test program, and then the torque correcting unit 25 carries out the following torque correcting operation when a NC machining program is executed.

The a-contacts of the selector switches 23 and 24 are selected to execute the NC machining program. The zero feed rate detecting unit 26 monitors the velocity feedback signal and gives a zero feed rate detection signal to the torque correcting unit 25 upon the detection of the reduction of velocity feedback signal to zero. Then, the torque correcting unit 25 reads a reference torque Tc corresponding to the radius R and the feed rate F at the time of the detection from the correction torque table storage unit 22, and gives the reference torque Tc to the integrator 16 including the current loop for torque correction.

Figure 6:
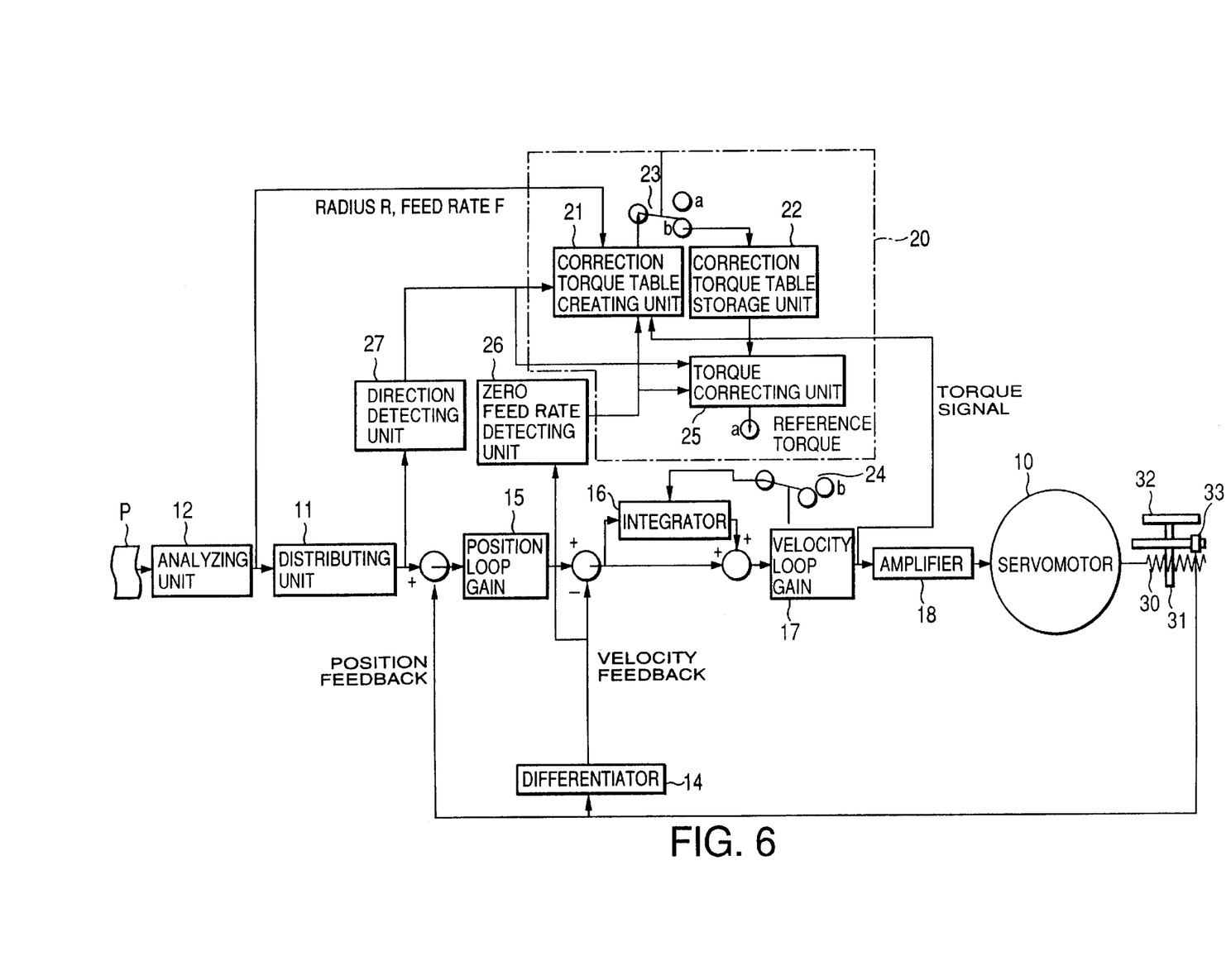
FIG. 6 is a block diagram of a servo control system for carrying out a servomotor control method in a second embodiment according to the present invention.

Although the invention has been described as applied a servomotor control method for controlling a servo control system of a semiclosed loop type in which a feedback signal provided by the position transducer 13 associated with the output shaft of the servomotor 10 is used. As shown in FIG. 6, the present invention is applicable to a servo control system of a full-closed loop type in which a position transducer 33 detects directly the position of a movable body 32, such as a table, driven for movement through a ball screw 30 and a nut 31 by a servomotor 10.

As is apparent from the foregoing description, according to the present invention, a reference torque at quadrant change can be accurately determined without being affected by inertial force or gravity because the reference torque for correcting torque is determined on the basis of the difference between the torque signal at quadrant change and the maximum or minimum torque signal immediately after the reversion of the servomotor. Consequently, the quadrant protrusion can be effectively reduced because the torque signal is fed back to the control system after correcting the same by using the reference torque free from the influence of inertial force or gravity.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A method for controlling a servomotor to drive a movable body for a circular interpolation feed motion, while measuring a position of the movable body directly or indirectly to provide a feedback signal, said method comprising:

detecting a torque signal sent to the servomotor approximately at quadrant change when the moving direction of the movable body changes, and detecting a maximum or minimum torque signal sent to the servomotor at a moment immediately after reversion of the servomotor;

determining a reference torque for correction on the basis of a difference between the torque signal detected approximately at quadrant change and the maximum or minimum torque signal detected at a moment immediately after the reversion of the servomotor; and correcting the torque signal to be delivered to the servomotor at quadrant change on the basis of the reference torque.

2. The servomotor control method according to claim 1, wherein a torque signal at a moment when a feedback rate signal of about zero is detected is used as the torque signal at quadrant change.

3. The servomotor control method according to claim 1, wherein a torque signal is differentiated, and a torque signal approximately at a moment when the derivative of differentiation after quadrant change becomes zero is used as the maximum or minimum torque signal immediately after the reversion of the servomotor.

4. A method for controlling a servomotor to drive a movable body for a circular interpolation feed motion, while measuring a position of the movable body directly or indirectly to provide a feedback signal, said method comprising:

executing a test program which specifies a given radius of a circular path and a given feed rate and makes the movable body move for a test circular interpolation feed motion;

detecting a torque signal sent to the servomotor approximately at quadrant change when the direction of motion of the movable body changes, and detecting a maximum or minimum torque signal sent to the servomotor at a moment immediately after reversion of the servomotor;

determining a reference torque for the radius and the feed rate on the basis of a difference between the torque signal detected approximately at quadrant change and the maximum or minimum torque signal detected at a moment immediately after reversion of the servomotor;

producing a correction torque table tabulating reference torques for correction corresponding to sets of radii of circular paths and feed rates by repeating the test program for different radii and different feed rates; and correcting the torque signal to be delivered to the servomotor approximately at quadrant change on the basis of a reference torque read from the correction torque table during execution of a numerical control program.

5. The servomotor control method according to claim 4, wherein a torque signal at a moment when a feedback velocity signal of about zero is detected is used as the torque signal at quadrant change.

6. The servomotor control method according to claim 4, wherein a torque signal is differentiated, and a torque signal approximately at a moment when the derivative of differentiation after quadrant change becomes zero is used as the maximum or minimum torque signal immediately after the reversion of the servomotor.

* * * * *